Patented June 7, 1927.

1,631,871

UNITED STATES PATENT OFFICE.

WILLIAM J. KELLY, OF AKRON, OHIO, ASSIGNOR TO THE GOODYEAR TIRE & RUBBER COMPANY, OF AKRON, OHIO, A CORPORATION OF OHIO.

PROCESS OF MANUFACTURING MERCAPTO-BENZO-THIAZOLE.

No Drawing.   Application filed August 7, 1922. Serial No. 580,313.

My invention relates to a method of producing an accelerator and it is particularly directed to the manufacture of mercaptobenzothiazole, which has been found to be a highly efficient accelerator.

It has been suggested, heretofore, that mercaptobenzothiazole be utilized as an accelerator, and a method of its production has been suggested which, however, unnecessarily increased the cost thereof. Although the accelerator, even as prepared heretofore, is not an expensive chemical, nevertheless its cost may be materially reduced by following the method of my invention. Heretofore, the production of the accelerator was accomplished by first producing thiocarbanilid, which I have discovered is an unnecessary step in the production of the chemical.

In addition to decreasing the expense of producing mercaptobenzothiazole, my invention prevents the formation of anilidobenzothiazole, which is formed in the usual process of manufacturing the above designated material. It is believed that anilidobenzothiazole tends to soften the rubber stock when it is compounded therewith along with the accelerator and may possibly retard acceleration of the vulcanization to a certain extent. In any event, its presence is not desirable and by practicing the method of my invention its formation is prevented.

A further advantage of my invention resides in the fact that a much higher yield of mercaptobenzothiazole may be obtained from the materials necessary to its formation, which aids materially in reducing the cost of the ultimate product. Heretofore, yields of approximately 50% were probably the highest obtainable, whereas with my process a yield of 95% of mercaptobenzothiazole may readily be obtained without any expensive equipment, or without exercising unusual care in its production.

In practicing my invention, I utilize a primary amine and sulfur, which reagents are associated with carbon bisulfide in excess of the amount of the first mentioned chemicals. With such a mixture, or agglomeration, of materials disposed in a suitable vessel such, for example, as an autoclave, heat is applied to produce a temperature of at least 150° C. Upon the application of the heat hydrogen sulfide is generated which, if not permitted to escape, gradually increases the pressure in the autoclave. I have found that it is desirable to regulate the pressure obtained in the autoclave, and this may readily be done by merely fitting a conduit thereto supplied with a suitable valve of ordinary type. For the best conditions to obtain a high yield of mercaptobenzothiazole, a temperature of substantially 250 to 300° C. may be utilized with a pressure resulting from the generated hydrogen sulfide gas of approximately 450 pounds. With such conditions established, yields of 95% of mercaptobenzothiazole may be uniformly obtained.

It will be appreciated that a rather wide range of temperature conditions may be established to produce mercaptobenzothiazole with a far greater degree of efficiency than has been reached heretofore, and the specific conditions set forth are only given to illustrate the range of temperatures and pressures which are desirable for exceptionally high yields. If an amine, sulfur, and carbon bisulfide are merely disposed in an autoclave and heat applied so that a temperature of about 280 to 285° C. is established, the pressure will increase to between 600 to 700 pounds per square inch. The production of mercaptobenzothiazole under such conditions will be from 95 to 97% of the theoretical, but if the pressure is released at 250 pounds, by means of a suitable valve, and maintained at that amount, the yield will be approximately 75%. It is apparent, therefore, that the yield varies with the pressure established, but it is not necessary to regulate the pressure to a very great extent in order to obtain high yields. For example, at a temperature of 250° C. a pressure of 450 pounds is desirable, but it may vary more than 100 pounds in either direction without affecting the yield materially.

The product resulting from the reaction of the amine, sulfur and carbon bisulfide, heated in the autoclave under a regulated pressure, is dissolved in sodium hydroxide from which solution the pure mercaptobenzothiazole or one of its homologs is precipitated by the addition of an acid, such as hydrochloric. The resulting material is then filtered, washed and dried, the final product being commercially pure mercaptobenzothiazole, which is highly efficient in the acceleration of the vulcanization of rubber and rubber compounds.

I have found that a primary amine, such as aniline, is one of the most suitable chemicals to utilize with sulfur and carbon bisulfide, inasmuch as it is inexpensive and easily obtained in quantities. However, other amines may be utilized to produce homologs of mercaptobenzothiazole, such, for example, as the toluidines, naphthylamines, phenetidines, xylindines, anisidines, aromatic diamines, etc.

The following equations indicate the reactions that occur when one mol. (93 grs.) of aniline is used with one mol. (32 grs.) of sulfur and one mol. (76 grs.) plus 15% to 20% excess of carbon bisulfide:

$C_6H_5NH_2 + CS_2 = C_6H_5NH \cdot CS \cdot SH$

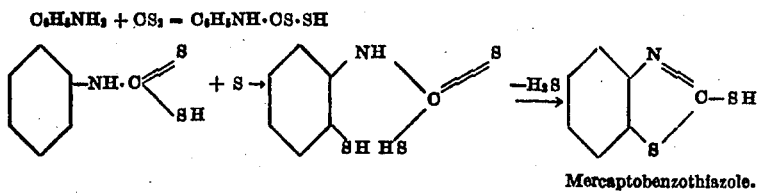

Mercaptobenzothiazole.

If aniline and carbon bisulfide are associated in the presence of sulfur at ordinary temperatures, thiocarbanilid is formed and hydrogen sulfide is evolved. With other amines analogous reactions occur. If hydrogen sulfide is brought into intimate association with a thiourea at about 140° C., it is completely decomposed into amine and carbon bisulfide even at atmospheric pressure. Consequently, it will be readily understood that the hydrogen sulfide prevents the formation of thiocarbanilid at high pressures. The pressure of the hydrogen sulfide on the other hand is insufficient to prevent the oxidation of the ortho H atom of the benzol ring and the subsequent splitting off of the hydrogen sulfide to close the thiazol ring. The hydrogen sulfide, however, will prevent the oxidation of the mercaptan to the disulfide, and, consequently, a reaction is obtained which is forced to follow a given course and thus results in nearly theoretical yields. With other amines, such, for example, as ortho and para toluidine, the yields are less because of side reactions involving the methyl ($CH_3$) group.

Although I have specifically described a process of producing mercaptobenzothiazole and given specific temperature and pressure conditions suitable for reducing production costs, it is obvious that minor changes may be made in the conditions established in the process and in the exact manner of establishing such conditions without departing from the spirit or scope of the invention, and I desire, therefore, that no limitations shall be imposed except such as are indicated in the appended claims.

What I claim is:

1. A method of producing mercaptothiazoles or their homologs that comprises associating a primary aromatic amine having a free ortho position with sulphur and carbon bisulfide, subjecting the mixture to a temperature between 150° C. and 300° C. and establishing a pressure of at least 100 pounds per square inch.

2. A method of producing mercaptothiazoles or their homologs that comprises associating a primary aromatic amine having a free ortho position with sulfur and substantially 15% to 20% greater quantity of carbon bisulfide, and subjecting the materials to a temperature between 150° C. and 300° C. and a pressure of not less than 100 pounds per square inch.

3. A method of producing mercaptobenzothiazole that comprises associating aniline with sulphur and carbon bisulfide at a temperature between 150° C. and 300° C. and under a pressure between 100 and 700 pounds per square inch.

4. A method of producing mercaptobenzothiazole that comprises associating aniline with sulphur and carbon bisulfide at a temperature of substantially 250° C. and under a pressure of approximately 450 pounds per square inch.

5. A method of producing mercaptobenzothiazole or its homologs that comprises associating a primary phenyl amine having a free ortho position with sulfur and carbon bisulfide, subjecting the materials to a temperature between 150° C. and 300° C., and maintaining a positive pressure, regulated by permitting the escape of the gas generated.

6. A method of producing a mecaptothiazole that comprises associating a primary aromatic amine having a free ortho position with sulfur and a quantity of carbon bisulfide 15% to 20% greater than the first mentioned materials, applying heat thereto in order to produce a temperature of substantially 250° C., and regulating the pressure by controlling the escape of generated gas to maintain approximately 450 pounds per square inch upon the materials.

7. A method of producing a mercaptobenzothiazole that comprises associating a primary phenyl amine having a free ortho position with sulfur and carbon bisulfide, subjecting the materials to a temperature between 150° C. and 300° C., regulating the pressure by controlling the escape of gas generated, dissolving the product in sodium hydroxide, precipitating the mercaptobenzothiazole by adding acid, filtering the precipitate, washing and drying the product.

8. A method of producing mercaptobenzothiazole that comprises mixing one mol. of aniline with one mol. of sulfur and one mol. plus 15% to 20% excess of carbon bisulfide, applying heat thereto to establish a temperature of substantially 250° C., and regulating the pressure by controlling the escape of generated gas to maintain approximately 450 pounds per square inch upon the materials.

9. A method of producing mercaptobenzothiazole or its homologs that comprises confining the corresponding primary aromatic amine having an available ortho position with sulfur and carbon bisulfide in a container and applying heat to create a temperature of 150° to 300° C.

10. A method of producing thiazoles which comprises causing a primary aromatic amine having an available ortho position to react with sulfur and carbon bisulfide under positive pressure and elevated temperature not to exceed the decomposing temperature of the product.

11. A method of preparing mercaptothiazoles which comprises causing a primary aromatic amine having an available ortho position to react with sulfur and carbon bisulfide under positive pressure and at a temperature of not less than 150° C. and not more than the decomposing temperature of the product.

12. A method of producing mercaptoarylthiazoles that comprises associating a corresponding primary aromatic amine having an available ortho position with sulfur and carbon bisulfide under positive pressure and elevating temperatures not to exceed the decomposing point of the product.

13. That step in the manufacture of thiazoles which consists in subjecting the reaction product of sulphur, carbon bisulfide and a primary aromatic amine having an available ortho position to a positive pressure of hydrogen sulfide and an elevated temperature not to exceed the decomposition temperature of the thiazole product.

In witness whereof, I have hereunto signed my name.

WILLIAM J. KELLY.